United States Patent
Mao

(10) Patent No.: US 11,770,735 B2
(45) Date of Patent: Sep. 26, 2023

(54) OVERHEAD REDUCTION IN CHANNEL STATE INFORMATION FEEDBACK

(71) Applicant: Nokia Technologies Oy, Espoo (FI)

(72) Inventor: Xiaomao Mao, Paris (FR)

(73) Assignee: Nokia Technologies Oy, Espoo (FI)

( * ) Notice: Subject to any disclaimer, the term of this patent is extended or adjusted under 35 U.S.C. 154(b) by 317 days.

(21) Appl. No.: 17/312,656

(22) PCT Filed: Jan. 17, 2019

(86) PCT No.: PCT/CN2019/072206
§ 371 (c)(1),
(2) Date: Jun. 10, 2021

(87) PCT Pub. No.: WO2020/147076
PCT Pub. Date: Jul. 23, 2020

(65) Prior Publication Data
US 2022/0053366 A1    Feb. 17, 2022

(51) Int. Cl.
*H04W 28/02* (2009.01)
*H04L 5/00* (2006.01)
(Continued)

(52) U.S. Cl.
CPC ....... *H04W 28/0289* (2013.01); *H04L 5/0048* (2013.01); *H04W 72/52* (2023.01)

(58) Field of Classification Search
CPC . H04W 28/0289; H04W 72/50; H04W 72/52; H04L 5/0048; H04L 5/005; H04L 5/0051
See application file for complete search history.

(56) References Cited

U.S. PATENT DOCUMENTS

| 5,867,479 | A | * | 2/1999 | Butash | H04J 1/05 370/480 |
| 6,132,566 | A | * | 10/2000 | Hofmann | C23C 14/358 204/192.15 |

(Continued)

FOREIGN PATENT DOCUMENTS

| CN | 102204141 A | 9/2011 |
| CN | 106412352 A | 2/2017 |

(Continued)

OTHER PUBLICATIONS

Office action received for corresponding Chinese Patent Application No. 201980089343.0, dated Aug. 23, 2022, 6 pages of office action and no page of translation available.

(Continued)

*Primary Examiner* — Jenee Holland
(74) *Attorney, Agent, or Firm* — Nokia Technologies Oy

(57) ABSTRACT

Method, apparatuses, and computer program product for overhead reduction are provided. One method may include determining a channel sparsity. The method may also include determining a shut-off ratio based on the channel sparsity ratio. In addition, the method may include providing feedback to a network node of a suggested shutoff pattern or a shut-off index from a shut-off table for reference signals, and receiving instructions from the network node to execute a shut-off pattern or a shut-off index selected by the network node. Further, the method may include executing a shut-off procedure according to the shut-off pattern or the shut-off index selected by the network node.

16 Claims, 4 Drawing Sheets

(51) Int. Cl.
*H04L 25/03* (2006.01)
*H04L 27/26* (2006.01)
*H04W 72/52* (2023.01)

(56) References Cited

U.S. PATENT DOCUMENTS

| | | | |
|---|---|---|---|
| 9,785,706 B2* | 10/2017 | Tan | G06F 16/683 |
| 2003/0008691 A1* | 1/2003 | Chen | H04W 68/025 |
| | | | 455/574 |
| 2004/0017224 A1* | 1/2004 | Tumer | H03F 3/087 |
| | | | 327/51 |
| 2007/0171960 A1* | 7/2007 | Zhang | H04B 1/7101 |
| | | | 375/E1.022 |
| 2011/0122930 A1* | 5/2011 | Al-Naffouri | H04L 27/2618 |
| | | | 375/296 |
| 2012/0250748 A1 | 10/2012 | Nguyen et al. | |
| 2013/0244710 A1 | 9/2013 | Nguyen et al. | |
| 2014/0010131 A1* | 1/2014 | Gaal | H04L 5/001 |
| | | | 370/311 |
| 2014/0233530 A1* | 8/2014 | Damnjanovic | H04W 36/34 |
| | | | 370/331 |
| 2015/0110210 A1* | 4/2015 | Yang | H04L 5/0048 |
| | | | 375/267 |
| 2015/0223228 A1* | 8/2015 | Rune | H04W 52/0209 |
| | | | 370/329 |
| 2015/0309136 A1* | 10/2015 | Shu | G01R 33/5611 |
| | | | 324/309 |
| 2016/0037426 A1* | 2/2016 | Li | H04W 36/30 |
| | | | 370/332 |
| 2016/0247089 A1 | 8/2016 | Zhao et al. | |
| 2017/0032055 A1 | 2/2017 | Eisemann et al. | |
| 2017/0064478 A1* | 3/2017 | Lai | H04R 3/005 |
| 2018/0139727 A1* | 5/2018 | Bayesteh | H04B 7/0689 |
| 2018/0189631 A1* | 7/2018 | Sumbul | G06N 3/049 |
| 2019/0021117 A1* | 1/2019 | Zhou | H04W 4/70 |
| 2019/0228284 A1* | 7/2019 | Holland | G06N 3/047 |
| 2019/0373647 A1* | 12/2019 | Rugeland | H04W 72/0446 |
| 2020/0186189 A1* | 6/2020 | Herath | H04B 1/7143 |
| 2020/0286501 A1* | 9/2020 | Xiao | G10L 21/0208 |
| 2020/0301995 A1* | 9/2020 | Shibata | G06N 3/08 |
| 2020/0374054 A1* | 11/2020 | Shattil | H04L 5/0005 |
| 2021/0067392 A1* | 3/2021 | Abdoli | H04L 27/2621 |
| 2022/0222533 A1* | 7/2022 | Yoo | G06F 15/80 |

FOREIGN PATENT DOCUMENTS

| | | |
|---|---|---|
| WO | 2015/055398 A1 | 4/2015 |
| WO | 2017/019522 A1 | 2/2017 |
| WO | 2019/218317 A1 | 11/2019 |

OTHER PUBLICATIONS

Candes et al., "An Introduction To Compressive Sampling", IEEE Signal Processing Magazine, Mar. 2008, pp. 21-30.

International Search Report and Written Opinion received for corresponding Patent Cooperation Treaty Application No. PCT/CN2019/072206, dated Sep. 29, 2019, 9 pages.

Extended European Search Report received for corresponding European Patent Application No. 19910016.5, dated Jun. 15, 2022, 6 pages.

"CSI Enhancements for MU-MIMO Support", 3GPP TSG RAN WG1 Meeting #94-bis, R1-1811406, Agenda: 7.2.8.1, Nokia, Oct. 8-12, 2018, 13 pages.

Zirwas et al., "Coded CSI Reference Signals for 5G—Exploiting Sparsity of FDD Massive MIMO Radio Channels", 20th International ITG Workshop on Smart Antennas, Mar. 9-11, 2016, pp. 45-52.

* cited by examiner

OVERHEAD REDUCTION IN CHANNEL STATE INFORMATION FEEDBACK

RELATED APPLICATION

This application was originally filed as PCT Application No. PCT/CN2019/072206 on Jan. 17, 2019, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to apparatuses, systems, and/or methods for reducing overhead in channel state information (CSI) feedback.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRA radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

In accordance with some example embodiments, a method may include determining a channel sparsity ratio. The method may also include determining a shut-off ratio based on the channel sparsity ratio. In addition, the method may include providing feedback to a network node of a suggested shut-off pattern or a shut-off pattern index from a shut-off pattern table for reference signals. Further, the method may include receiving instructions from the network node to execute a shut-off pattern or a shut-off pattern index selected by the network node. In addition, the method may include executing a shut-off procedure according to the shut-off pattern or the shut-off index selected by the network node.

In accordance with some example embodiments, an apparatus may include means for determining a channel sparsity ratio. The apparatus may further include means for determining a shut-off ratio based on the channel sparsity ratio. The apparatus may also include means for providing feedback to a network node of a suggested shut-off pattern or a shut-off index from a shut-off pattern table for reference signals. In addition, the apparatus may include means for receiving instructions from the network node to execute a shut-off pattern or a shut-off index selected by the network node. Further, the apparatus may include means for executing a shut-off procedure according to the shut-off pattern or the shut-off index selected by the network node.

In accordance with some example embodiments, an apparatus may include at least one processor and at least one memory including computer program code. The at least one memory and the computer program code may be configured to, with the at least one processor, cause the apparatus at least to determine a channel sparsity ratio. The at least one memory and the computer program code may also be configured to, with the at least one processor, cause the apparatus at least to determining a shut-off ratio based on the channel sparsity ratio. The at least one memory and the computer program code may also be configured to, with the at least one processor, cause the apparatus at least to provide feedback to a network node of a suggested shut-off pattern or a shut-off index from a shut-off pattern table for reference signals. In addition, the at least one memory and the computer program code may be configured to, with the at least one processor, cause the apparatus at least to receive instructions from the network node to execute a shut-off pattern or a shut-off index selected by the network node. Further, the at least one memory and the computer program code may be configured to, with the at least one processor, cause the apparatus at least to execute a shut-off procedure according to the shut-off pattern or the shut-off index selected by the network node.

In accordance with some example embodiments, a non-transitory computer readable medium can be encoded with instructions that may, when executed in hardware, perform a method. The method may determine a channel sparsity ratio. The method may further determine a shut-off ratio based on the channels sparsity ratio. The method may further provide feedback to a network node of a suggested shut-off pattern or a shut-off index from a shut-off pattern table for reference signals. The method may also receive instructions from the network node to execute a shut-off pattern or a shut-off index selected by the network node. The method may further execute a shut-off procedure according to the shut-off pattern or the shut-off index selected by the network node.

In accordance with some example embodiments, a computer program product may perform a method. The method may determine a channel sparsity ratio. The method may further determine a shut-off ratio based on the channels sparsity ratio. The method may further provide feedback to a network node of a suggested shut-off pattern or a shut-off index from a shut-off pattern table for reference signals. The method may also receive instructions from the network node to execute a shut-off pattern or a shut-off index selected by the network node. The method may further execute a shut-off procedure according to the shut-off pattern or the shut-off index selected by the network node.

In accordance with some example embodiments, an apparatus may include circuitry configured to determine a channel sparsity ratio. The circuitry may further determine a shut-off ratio based on the channels sparsity ratio. The circuitry may further provide feedback to a network node of a suggested shut-off pattern or a shut-off index from a shut-off pattern table for reference signals. The circuitry may also receive instructions from the network node to execute a shut-off pattern or a shut-off index selected by the network node. The circuitry may further execute a shut-off procedure according to the shut-off pattern or the shut-off index selected by the network node.

In accordance with some example embodiments, a method may include receiving feedback information comprising a suggested shut-off pattern or a shut-off index from a shut-off pattern table for reference signals. The method may also include determining a shut-off pattern or a shut-off index for execution by a mobile station based the feedback information. The method may further include instructing the mobile station to execute a shut-off procedure according to the determined shut-off pattern or the shut-off index.

In accordance with some example embodiments, an apparatus may include means for receiving feedback information comprising a suggested shut-off pattern or a shut-off index from a shut-off pattern table for reference signals. The apparatus may also include means for determining a shut-off pattern or a shut-off index for execution by a mobile station based the feedback information. The apparatus may further include means for instructing the mobile station to execute a shut-off procedure according to the determined shut-off pattern or the shut-off index.

In accordance with some example embodiments, an apparatus may include at least one processor and at least one memory including computer program code. The at least one memory and the computer program code may be configured to, with the at least one processor, cause the apparatus at least to receive feedback information comprising a suggested shut-off pattern or a shut-off index from a shut-off pattern table for reference signals. The at least one memory and the computer program code may also be configured to, with the at least one processor, cause the apparatus at least to determine a shut-off pattern or a shut-off index for execution by a mobile station based the feedback information. In addition, the at least one memory and the computer program code may be configured to, with the at least one processor, cause the apparatus at least to instruct the mobile station to execute a shut-off procedure according to the determined shut-off pattern or the shut-off index.

In accordance with some example embodiments, a non-transitory computer readable medium can be encoded with instructions that may, when executed in hardware, perform a method. The method may receive feedback information comprising a suggested shut-off pattern or a shut-off index from a shut-off pattern table for reference signals. The method may also determine a shut-off pattern or a shut-off index for execution by a mobile station based the feedback information. The method may further instruct the mobile station to execute a shut-off procedure according to the determined shut-off pattern or the shut-off index.

In accordance with some example embodiments, a computer program product may perform a method. The method may receive feedback information comprising a suggested shut-off pattern or a shut-off index from a shut-off pattern table for reference signals. The method may also determine a shut-off pattern or a shut-off index for execution by a mobile station based the feedback information. The method may further instruct the mobile station to execute a shut-off procedure according to the determined shut-off pattern or the shut-off index.

In accordance with some embodiments, an apparatus may include circuitry configured to receive feedback information comprising a suggested shut-off pattern or a shut-off index from a shut-off pattern table for reference signals. The circuitry may also determine a shut-off pattern or a shut-off index for execution by a mobile station based the feedback information. The circuitry may further instruct the mobile station to execute a shut-off procedure according to the determined shut-off pattern or the shut-off index.

BRIEF DESCRIPTION OF THE DRAWINGS

For proper understanding of the invention, reference should be made to the accompanying drawings, wherein.

DETAILED DESCRIPTION

Figure 1:
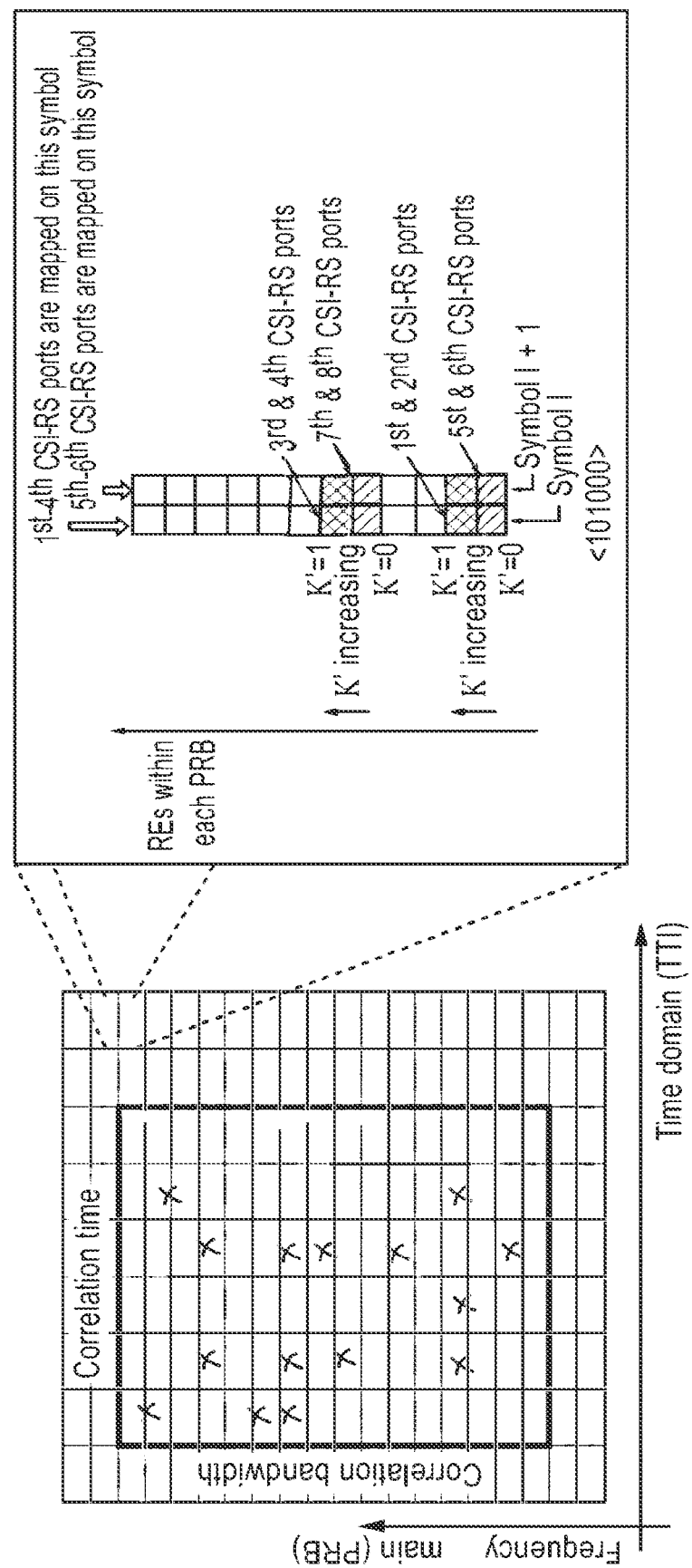
FIG. 1 illustrates an example shut-off pattern and an example 8-port channel state information (CSI) reference signal (RS) pattern according to an example embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for reference signal (RS) shut off, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Channel state information (CSI) feedback can be important in multiple-input and multiple-output (MIMO) transmission systems. For instance, CSI feedback may include CSI estimation at a user equipment (UE), CSI reporting, and CSI reconstruction at a next generation NodeB (gNB). A goal of CSI feedback may be to seek the best tradeoff between overhead/complexity and CSI reconstructing accuracy.

Certain proposals have been made in NR R16 MIMO WI. For example, overhead reduction is proposed along with targeting at the Type II CSI overhead issue while maintaining the CSI feedback accuracy to support a higher order of MU transmission. Further, 3GPP NR R15 describes Type II CSI reporting which includes two parts. The first part is reporting the index of predefined wideband beams, and the second part is reporting the combining coefficients associated with the wideband beams for each sub-band, which may be known as linear combination codebook.

By collecting both beams and their combining coefficients, gNB may reconstruct the UE downlink (DL) channel, and proceed with the DL precoding. As the first part of the wideband beams reporting builds multi-dimension orthogonal coordinates, the wideband beams may be predefined such that the UE only needs to report the indexes of the beams for the first part. According to such method, it may be possible to achieve lean reporting of overhead wideband beams, and focus on overhead reduction which targets cutting down the second part, the combining of coefficients reporting.

Several methods may be provided to reduce overhead resulting from combining coefficient reporting. These methods may include, for example, explicit feedback, frequency parameterization, and the "codebook over codebook" method. In particular, in explicit feedback, a virtual channel is built by arranging the combining coefficients in the frequency domain, and then the virtual channel is transformed by fast fourier transform (FFT) to the time domain. After the virtual channel has been transformed, the explicit feedback reports time domain taps to the gNB for channel reconstruction. Similarly, the frequency parameterization method uses a curve fitting method to represent the virtual channel in the frequency domain with parametered functions of minimized order. In addition, the "codebook over codebook" method simply applies another layer of codebook representation over the virtual channel so that the reporting of combining coefficients may be replaced by reporting indexes.

The aforementioned methods share a common design principle, the combining coefficients, which may be seen as the spatial characteristics of the aggregated channel (after abstraction of the wideband beams) in the frequency domain, are rearranged and considered as a virtual channel and then transformed into another domain by FFT, parameterization, or codebook. Further, non-significant taps in the transformed domain are neglected, and only the significant taps may be reported in order to reduce overhead. In other words, these methods are all lossy compression methods, and the overhead reduction comes with the expense of losing CSI reconstructing accuracy.

Another disadvantage of the aforementioned methods is that all of them merely focus on compressing the second part; the combining coefficients reporting. However, overhead reduction of CSI feedback involves not only the codebook design and compressing the combining coefficients. Rather, overhead reduction of CSI also involves the reference signal design and the control signaling. For example, when less reference signal is needed to sound the channel, less reporting overhead is achieved as the combining coefficients are reported in a per physical resource block (PRB)/resource block group (RBG) or per sub-band manner In summary, a systematic view/design which considers all system aspects in a comprehensive way is needed to achieve the overhead reduction target.

In order to provide lossless compression, a compressive sensing method may be used. Specifically, compressive sensing is a method originally derived from image processing. For example, the method may provide lossless compression if the image is sparse and push it to an extreme that only a few samples are needed to recover the image. Moreover, compressive sensing may take advantage of antenna correlation, and omit the reference signal transmission in the spatial domain, which is only applicable to rank 1 transmission (the beamforming case). However, for higher rank transmission and MU cases, which is the motivation of high performance codebook design for R16 Type II CSI reporting, there is a need to keep the spatial domain degree of freedom. Omitting transmission on an antenna is no longer an option.

According to certain example embodiments, a CSI feedback overhead reduction method may be provided based on the observation that the UE spatial channel in a massive MIMO system is usually very sparse. For instance, in the CSI overhead reduction method, compressive sensing is applied from image processing theory. As compressive sensing may achieve lossless compression if the image is sparse and push it to an extreme that only a few samples are needed, this method may outperform conventional methods by guaranteeing the best channel reconstruction accuracy as well as the best overhead reduction efficiency. Although previous methods merely considered combining coefficients compression, the design of certain example embodiments differs in that it may be done in a systematic way and includes three parts: the reference signal design; the codebook design; and the report signaling.

In the reference signal design, R15 specified reference signals in the frequency domain may be partially shut off according to a predefined shut-off pattern. In certain example embodiments, the patterns may be configured as 2D or in one of the domains, depending on how the gNB perceives the UE DL channel through uplink (UL) sounding or UE feedback. According to an example embodiment, the shut-off pattern may be mutually agreed between the gNB and UE prior to transmission. Since R15 specified channel state information reference signal pattern (CSI-RS) may be used for both channel estimation and interference estimation, the shut-off CSI-RS may be seen as extra zero power (ZP) CSI-RS to enhance interference estimation. Alternatively, in another example embodiment, the shut-off resource elements (REs) may be used for data transmission. The difference between ZP CSI-RS and the shut-off REs is that ZP CSI-RS may be seen as reference signal transmission as the REs are occupied with zero powered signal (they are still overhead). In contrast, in certain example embodiments, shut-off REs may freely be used to transmit any signal, including ZP CSI-RS.

According to the Type II codebook design in an example embodiment, the first part of the wideband reporting may remain unchanged. However, the second part reporting in the time-frequency domain may be partially omitted according to the shut-off pattern. For instance, for a reporting of the transmission time interval (TTI) PRB, only if there is CSI-RS which is not shut off, the CIR may be collected and feedback. In another example embodiment, the reporting method of the CIR may be determined based on the sparsity of the channel. For example, if the channel is very sparse and after applying the shut-off pattern only a few TTI-PRB remain, the CIR may be reported directly (known as explicit feedback). Otherwise, other methods may be further applied to the remaining TTI-PRB to reduce the overhead. However, applying such other methods may negatively affect channel reconstruction accuracy by bringing loss into the channel reconstruction.

In signaling and control design of certain example embodiments, a few predefined shut-off patterns may be agreed, and the gNB may first determine one of the patterns based on UL/DL reciprocity or UE feedback. Taking the reciprocity case as an example, the gNB may monitor UL sounding reference signal (SRS) and determine UE channel sparsity. Using the sparsity information, the gNB may then signal to the UE the selected shut-off pattern and the reporting method. In one example embodiment, the method may be applied on top of Type II CSI reporting. However, in other example embodiments, the method may not necessarily depend on Type II CSI reporting, and may for example, instead be applied to other methods. Afterwards, the gNB may calculate the reporting overhead and allocate the resource to the UE for CSI reporting. In another example embodiment, the UE may monitor the DL channel and calculate the channel sparsity. When the channel is very sparse, the UE feedbacks the observation to the gNB and suggests a shut-off pattern. Since shutting off per compressive sensing depends on the channel sparsity, this feature, according to an example embodiment, may be dynamically enabled according to the UE channel condition.

In accordance with certain example embodiments, a muting pattern design and signaling may be provided. FIG. 1 illustrates an example shut-off pattern and an 8-port CSI-RS pattern according to an example embodiment. In the example R15 8-port CSI-RS pattern illustrated in FIG. 1, the CSI-RS may occupy two consecutive symbols within a subframe, and the position of the first symbol may be configured. FIG. 1 also illustrates ports 1, 2, 5, 6 and ports 3, 4, 7, 8 that are grouped into two clusters, and the distance between the two clusters may also be configured. Within one cluster, one port may occupy two consecutive subcarriers, and the overlapped ports may apply orthogonal coding so that they may be separated. Further, as illustrated in FIG. 1, the crosses represent those PRB-TTI in which CSI-RS REs are shut off.

According to certain example embodiments, within the correlation time and bandwidth, the channel may be seen as highly correlated. When channel hardening is applied (e.g., when the wideband beams are abstracted), the aggregated channel after channel hardening is usually very sparse. According to compressive sensing theory, only a few samples may need to be collected to reconstruct the channel with negligible loss.

Based on certain simulations in certain example embodiments, for Type II CSI reporting, 7 beams may be sufficient to reconstruct the channel with negligible loss. The compressive sensing theory interprets that for most of the massive MIMO scenarios, that within a correlation time and bandwidth, only 7 samples (PRB-TTI) are needed to reconstruct the channel. Nevertheless, in other example embodiments, more or less samples may be required as the design of the shut-off pattern may also need to consider the system robustness. In certain example embodiments, shut-off patterns may be designed in one or more ways including, for example, by way of the Binomial Distribution based method (BD shut-off), as one example embodiment of shut-off pattern design.

In certain example embodiments, the BD shut-off pattern may be a sequence P of a length equal to a maximum PRB number, N, multiplied with maximum CSI reporting period TTI, T. This length N·T sequence P may be composed of 1s and 0s. Further, the ratio of 0s and 1s represents the shut-off ratio, R, which depends on the sparsity of the aggregated channel after channel hardening. Given a shut-off ratio R, the sequence may be generated by implementing a pseudo random function $f$ with a designated random seed s. The expression for the N·T sequence P may be presented as follows:

$$P_{N \cdot T} = f(R, s)$$

According to certain example embodiments, given several shut-off ratios, several sequences may be generated and listed into a table. The indexes of the table entries may be signaled to the UE together with other parameters to configure the CSI reporting. For instance, an example shut-off pattern table is shown in Table I as follows:

TABLE I example shut-off pattern table

| index | Shut-off sequence | Shut-off ratio |
|---|---|---|
| 0 | 000000000000 ... 000000 | disabled |
| 1 | 000001000000 ... 000000 | 0.9 |
| 2 | 000000010000 ... 100000 | 0.8 |
| ... | 101001001111 ... 111100 | .... |

In an example embodiment, when the gNB signals a shut-off pattern index to the UE to enable the shut-off feature, the UE may apply the shut-off sequence in a frequency domain first and time domain second way. If a PRB-TTI is shut off by "0," the scheduled reference signal within the PRB-TTI may not be transmitted. According to an example embodiment, the REs that are originally allocated to reference signals transmission may be considered as ZP CSI-RS, and used for interference estimation. Alternatively, the REs may be used to transmit DL data. In the latter case, rate matching information may be updated and signaled to the UE.

According to certain example embodiments, a control and signaling design may be provided. For instance, the selection of the shut-off pattern in certain example embodiments may be determined by the gNB based on UL/DL channel reciprocity. Alternatively, the selection of the shut-off pattern may be reported and suggested by the UE based on its channel sparsity. As one example, this may be performed on the UE side. For instance, according to an example embodiment, channel correlation time t (in terms of TTI) and bandwidth n (in terms of PRB) may be calculated from the UE Doppler and delay, both of which may be classic UE channel estimation output figures. With t and n, the shut-off ratio may be calculated as follows:

$$R = \left(1 - \frac{a}{t \cdot n}\right) \text{ if } t \cdot n \geq 7$$

Where, $$a = b \cdot 7$$

In the above expression, ratio b may be considered as a system configuration number, which may provide an extra robustness adjusting ratio to combat with noise and interference, while 7 is a predetermined number obtained from simulations. According to an example embodiment, the ratio b may be in the range of [1, t·n/7]. Further, shut-off ratio R represents the channel sparsity, and the UE may provide feedback of the shut-off ratio to the gNB. Alternatively, the UE may provide feedback of the suggested shut-off pattern index by looking up the shut-off pattern table.

After the gNB acquires UE channel sparsity information and the suggested shut-off pattern index, the gNB may select the shut-off pattern and determine the reporting method based on the UE report as well as the current system capacity. According to certain example embodiments, the channel may be very sparse, for example having a large shut-off ratio. In an example embodiment, the range of the shut-off ratio may be [0, 1], where 0 means the shut off is disabled if t·n<7. According to an example embodiment, if the channel has a large shut-off ratio, explicit feedback may be configured according to a determined reporting method. Then the gNB may signal to the UE the determined shut-off pattern index, together with which the updated rate matching information if the shut-off REs are to be used to transmit data. According to certain example embodiments, the enabling of the shut-off pattern may be simply done by signaling a non-zero index (see Table I).

According to certain example embodiments, since the correlation time and the bandwidth may vary according to each UE scenario, several shut-off ratios may be needed to cover all cases and to provide robustness. However, if the aggregated channel is transformed by 2D-FFT into a delay-doppler plane and the shut-off pattern is applied in a delay-doppler plane, only one shut-off ratio may be needed. That is, because in an orthogonal frequency-division multiplexing (OFDM) system, the maximum delay and maximum Doppler the system may support are fixed numbers, which are the length of the cyclic prefix and the subcarrier bandwidth. With these fixed numbers and the number 7 from previous simulation experiences, it may be possible to calculate one fix shut-off ratio. Further, in the delay-doppler plane, this fix shut-off ratio may stand for the worst case the system may support, so that it can cover all cases. As one shut-off ratio is sufficient for all cases in the delay-doppler domain, on-off signaling may be used to enable the feature instead of signaling the index.

Other example embodiments may fit into R15 Type II CSI reporting. For instance, at one reporting instance, the wideband beams reporting may remain the same. Further, the combining coefficients for a sub-band will not be reported if they are within the sub-band all PRBs are shut off. For other cases, the combining coefficients reporting may remain.

According to certain example embodiments, the shut off of CSI-RS would not impact the wideband beam selections. As wideband beams span multi-dimensional orthogonal coordinates where the UE channel may be represented by combining coefficients, the wideband beams may usually be sustained longer than the combining coefficients. By collecting and filtering the CSI-RS across several reporting instances, the wideband beams may be estimated without losing accuracy.

In other example embodiments, DL power control may be provided by CSI-RS shut-off cases. For instance, for power control, after a shut-off pattern is applied, the remaining CSI-RS may be power boosted to maintain coverage. Here, the boosting ratio may be set as the reciprocal of the shut-off ratio.

Figure 2:
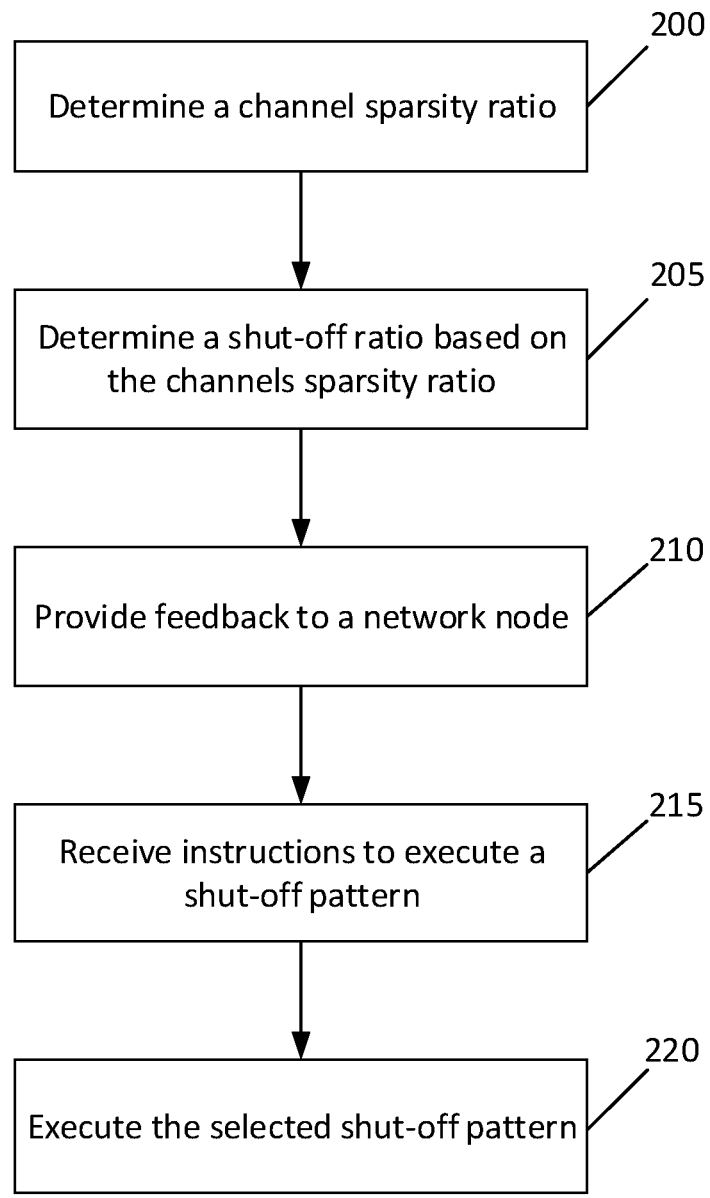
FIG. 2 illustrates an example flow diagram of a method, according to an example embodiment.

FIG. 2 illustrates an example flow diagram of a method according to an example embodiment. In certain example embodiments, the flow diagram of FIG. 2 may be performed by a mobile station and/or UE, for instance. According to one embodiment, the method of FIG. 2 may include initially, at 200, determining a channel sparsity ratio. The method may also include, at 205, determining a shut-off ratio based on the channel sparsity ratio. At 210, the method may include providing feedback to a network node of a suggested shut-off pattern or a shut-off index from a shut-off pattern table for reference signals. In addition, at 215, the method may include receiving instructions from the network node to execute a shut-off pattern or a shut-off index selected by the network node. Further, at 220, the method may include executing a shut-off procedure according to the shut-off pattern or the shut-off index selected by the network node.

According to certain example embodiments, the shut-off pattern may include a shut-off pattern index from a shut-off pattern table. In another example embodiment, the shut-off pattern may be received at the mobile station from the network node. According to a further example embodiment, the feedback provided to the network node may be based on the sparsity of the channel. In another example embodiment, the shut-off pattern may be executed in a frequency domain first and time domain second way. In a further example embodiment, the suggested shut-off pattern may be provided dynamically according to channel conditions. Further, according to an example embodiment, determining the channel sparsity ratio may include monitoring a downlink channel. In another example embodiment, the shut-off ratio may be determined based on a channel correlation time, a bandwidth value, a robustness adjustment ratio, and a physical resource block transmission time interval.

Figure 3:
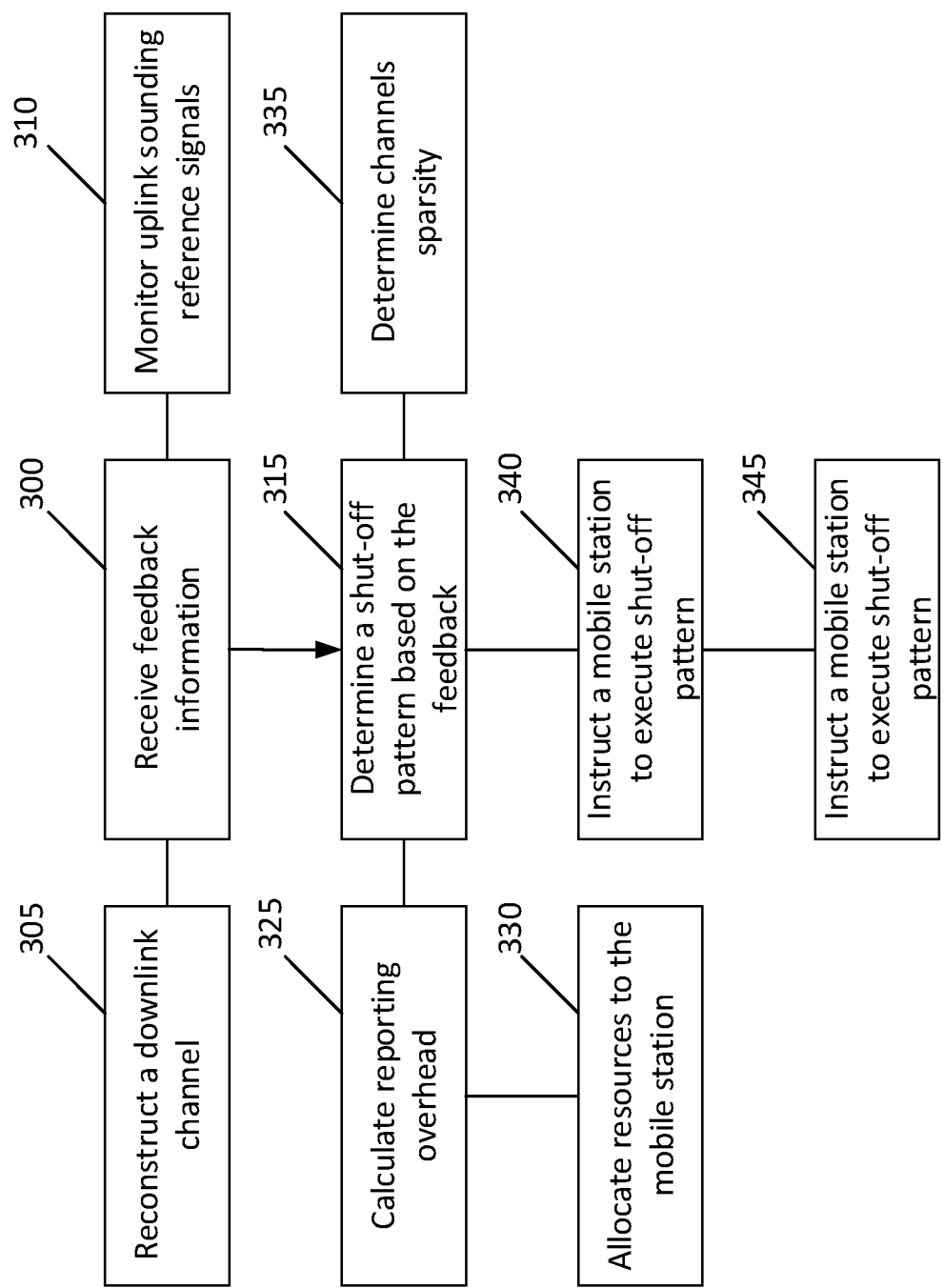
FIG. 3 illustrates an example flow diagram of another method, according to an embodiment.

FIG. 3 illustrates an example flow diagram of another method according to an example embodiment. In certain example embodiments, the flow diagram of FIG. 3 may be performed by a network entity or network node in a 3GPP system, such as LTE or 5G NR. For instance, in some example embodiments, the method of FIG. 3 may be performed by a base station, eNB, or gNB.

According to one example embodiment, the method of FIG. 3 may include initially, at 300, receiving feedback information including a suggested shut-off pattern or a shut-off index from a shut-off pattern table for reference signals. The method may also include at 305, reconstructing a downlink channel of the mobile station based on the feedback information. At 310, the method may include monitoring uplink sounding reference signals, and at 315, the method may include determining a shut-off pattern or a shut-off index for execution by a mobile station based on the feedback information. The method may further include, at 325, calculating a reporting overhead, and at 330, allocating resources to the mobile station based on the calculated reporting overhead. Further, at 335, the method may include determining a channel sparsity of the mobile station. In addition, the method may include, at 340, instructing the mobile station to execute a shut-off procedure according to the determined shut-off pattern or the shut-off index. Further, at 345, the method may include signaling a reporting method to the mobile station.

Figure 4A:
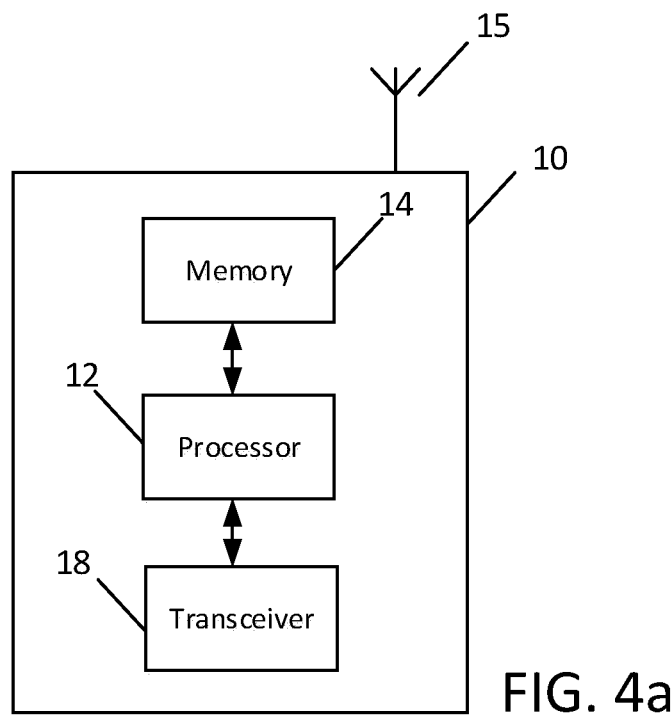
FIG. 4a illustrates a block diagram of an apparatus according to an example embodiment.

FIG. 4a illustrates an example of an apparatus 10 according to an example embodiment. In an example embodiment, apparatus 10 may be a node, host, or server in a communication network or serving such a network. For example, apparatus 10 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. In certain example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 4a.

As illustrated in the example of FIG. 4a, apparatus 10 may include a processor 12 for processing information and executing instructions or operations. Processor 12 may be any type of general or specific purpose processor. For example, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

According to certain example embodiments, processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In certain example embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the embodiments described herein, such as the flow or signaling diagrams illustrated in FIGS. 2 and 3. In some embodiments, apparatus 10 may be configured to perform a procedure overhead, for example.

For instance, in one embodiment, apparatus 10 may be controlled by memory 14 and processor 12 to receive feedback information including a suggested shut-off pattern or a shut-off index from a shut-off pattern table for reference signals. The apparatus 10 may also be controlled by memory 14 and processor 12 to determine a shut-off pattern or a shut-off index for execution by a mobile station based on the feedback information. In addition, the apparatus 10 may be controlled by memory 14 and processor 12 to instruct the mobile station to execute a shut-off procedure according to the determined shut-off pattern or the shut-off index.

In another embodiment, the apparatus 10 may be controlled by memory 14 and processor 12 to calculate a reporting overhead, and allocate resources to the mobile station based on the calculated reporting overhead. According to a further embodiment, the apparatus 10 may be controlled by memory 14 and processor 12 to reconstruct a downlink channel of the mobile station based on the feedback information. In a further embodiment, the apparatus 10 may be controlled by memory 14 and processor 12 to monitor uplink sounding reference signals, and determine a channel sparsity of the mobile station. Moreover, in another embodiment, the apparatus 10 may be controlled by memory 14 and processor 12 to signal a reporting method to the mobile station.

Figure 4B:
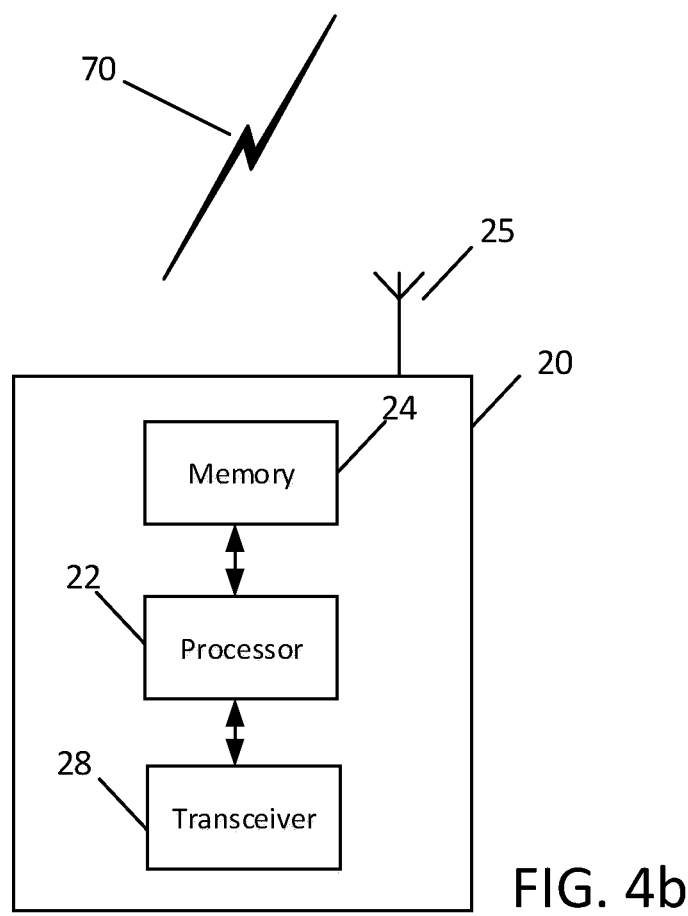
FIG. 4b illustrates a block diagram of another apparatus according to an example embodiment.

FIG. 4b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 4b.

As illustrated in the example of FIG. 4b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4b, multiple processors may be utilized according to other embodiments. For example, it should be understood that, in certain example embodiments, apparatus 20 may include two or more processors that may form a multiprocessor system (e.g., in this case processor 22 may represent a multiprocessor) that may support multiprocessing. According to certain example embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 10 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to certain example embodiments, processor 22 and memory 24 may be included in or may form a part of processing circuitry or control circuitry. In addition, in some embodiments, transceiver 28 may be included in or may form a part of transceiving circuitry.

As discussed above, according to certain example embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as the flow diagrams illustrated in FIGS. 2 and 3. For example, in certain embodiments, apparatus 20 may be configured to perform a procedure of overhead reduction, for instance.

For instance, in one embodiment, apparatus 20 may be controlled by memory 14 and processor 12 to determine a channel sparsity ratio. The apparatus 20 may also be controlled by memory 14 and processor 12 to determine a shut-off ratio based on the channel sparsity ratio. In addition, the apparatus 20 may also be controlled by memory 14 and processor 12 to provide feedback to a network node of a suggested shut-off pattern or a shut-off index from a shut-off pattern table for reference signals. Moreover, the apparatus 20 may also be controlled by memory 14 and processor 12 to receive instructions from the network node to execute a shut-off pattern or a shut-off index selected by the network node. In addition, the apparatus 20 may also be controlled by memory 14 and processor 12 to execute a shut-off procedure according to the shut-off pattern or the shut-off index selected by the network node.

Certain example embodiments described herein provide several technical improvements, enhancements, and/or advantages. For example, certain example embodiments, based on compressive sensing theory, may achieve CSI feedback overhead reduction while maintaining the CSI feedback performance. For example, a lossless compression may be achieved with respect to channel reconstructing accuracy. Certain example embodiments may also push the overhead reduction to an extreme that only a few samples may be needed to represent and recover the channel. Other example embodiments are capable of fitting well to the current Type II CSI codebook design. In addition, other example embodiments enable the two parts reporting to remain the same except some of the combining coefficients reporting which may be omitted.

Additional example embodiments provide further advantages and improvements of telecommunication systems. For example, it may be possible to achieve lossless compression with overhead reduction without sacrificing channel accuracy. It may also be possible to achieve the best overhead reduction by pushing the overhead reduction to an extreme that only a few samples would be needed if the channel is sparse. Moreover, it may be possible to achieve less reference signal overhead and shut-off REs may be used for data transmission. In addition, it may be possible to provide dynamic enabled features based on the UE channel sparsity, and achieve the best tradeoff between overhead and channel reconstruction accuracy.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. Although the above embodiments refer to 5G NR and LTE technology, the above embodiments may also apply to any other present or future 3GPP technology, such as LTE-advanced, and/or fourth generation (4G) technology.

Partial Glossary

CSI Channel State Information
eNB Enhanced Node B (LTE base station)
gNB 5G or NR Base Station
LTE Long Term Evolution
MIMO Multiple Input Multiple Output
MU Multi-User
NR New Radio
NR-U New Radio Unlicensed
PRB Physical Resource Block
RBG Resource Block Group
RE Resource Element
RF Radio Frequency
RS Reference Signals
SRS Sounding Reference Signal
TTI Transmission Time Interval
UE User Equipment
ZP Zero Power

What is claimed is:

1. A method for a mobile station, comprising:
determining a channel sparsity ratio;
determining a shut-off ratio based on the channel sparsity ratio;
providing feedback to a network node of a suggested shut-off pattern or a shut-off index from a shut-off pattern table for reference signals;
receiving instructions from the network node to execute a shut-off pattern or a shut-off index selected by the network node; and
executing a shut-off function according to the shut-off pattern or the shut-off index selected by the network node.

2. The method according to claim 1, wherein the shut-off pattern is executed in a frequency domain first and time domain second way; and/or wherein the suggested shut-off pattern is provided dynamically according to channel conditions.

3. The method according to claim 1, wherein determining the channel sparsity ratio comprises monitoring a downlink channel.

4. The method according to claim 1, wherein the shut-off ratio is determined based on a channel correlation time, a bandwidth value, a robustness adjustment ratio, and a physical resource block transmission time interval.

5. The method according to claim 1, further comprising:
calculating a reporting overhead; and
allocating resources to the mobile station based on the calculated reporting overhead.

6. The method according to claim 1, further comprising:
monitoring uplink sounding reference signals; and
determining a channel sparsity of the mobile station.

7. The method according to claim 1, further comprising receiving signaling indicating a reporting method at the mobile station.

8. An apparatus, comprising:
at least one processor; and
at least one memory comprising computer program code, the at least one memory and the computer program code are configured, with the at least one processor to cause the apparatus at least to
determine a channel sparsity ratio;
determine a shut-off ratio based on the channel sparsity ratio;
provide feedback to a network node of a suggested shut-off pattern or a shut-off index for reference signals;
receive instructions from the network node to execute a shut-off pattern or a shut-off index selected by the network node; and
execute a shut-off procedure according to the shut-off pattern or the shut-off index selected by the network node.

9. The apparatus according to claim 8, wherein the shut-off pattern is executed in a frequency domain first and time domain second way.

10. The apparatus according to claim 8, wherein the suggested shut-off pattern is provided dynamically according to channel conditions.

11. The apparatus according to claim 8, wherein determining the channel sparsity ratio comprises monitoring a downlink channel.

12. The apparatus according to claim 8, wherein the shut-off ratio is determined based on a channel correlation time, a bandwidth value, a robustness adjustment ratio, and a physical resource block transmission time interval.

13. The apparatus according to claim 8, wherein the at least one memory and the computer program code are further configured, with the at least one processor to cause the apparatus at least to
calculate a reporting overhead; and
allocate resources to the mobile station apparatus based on the calculated reporting overhead.

14. The apparatus according to claim 8, wherein the at least one memory and the computer program code are further configured, with the at least one processor to cause the apparatus at least to:
monitor uplink sounding reference signals; and
determine a channel sparsity of the apparatus.

15. The apparatus according to claim 8, wherein the at least one memory and the computer program code are further configured, with the at least one processor to cause the apparatus at least to receive a signal indicating a reporting method at the apparatus.

16. A non-transitory computer program product encoded with instructions, which when executed by an apparatus, cause the apparatus at least to:
determine a channel sparsity ratio;
determine a shut-off ratio based on the channel sparsity ratio;
provide feedback to a network node of a suggested shut-off pattern or a shut-off index for reference signals;
receive instructions from the network node to execute a shut-off pattern or a shut-off index selected by the network node; and
execute a shut-off procedure according to the shut-off pattern or the shut-off index selected by the network node.

* * * * *